SEQUENCING STATIC ELECTRONIC FLASHING CIRCUITS FOR PHOTOFLASH LAMP ARRAY
Original Filed April 29, 1969

Inventors:
Donald L. Watrous,
Paul T. Coté,
by Donald R. Campbell
Their Attorney.

Inventors:
Donald L. Watrous,
Paul T. Coté,
by Donald R. Campbell
Their Attorney.

July 11, 1972 D. L. WATROUS ET AL 3,676,045

SEQUENCING STATIC ELECTRONIC FLASHING CIRCUITS
FOR PHOTOFLASH LAMP ARRAY

Original Filed April 29, 1969 3 Sheets-Sheet 3

Inventors:
Donald L. Watrous,
Paul T. Cote,
by Donald R. Campbell
Their Attorney.

United States Patent Office 3,676,045
Patented July 11, 1972

3,676,045

SEQUENCING STATIC ELECTRONIC FLASHING CIRCUITS FOR PHOTOFLASH LAMP ARRAY

Donald L. Watrous, Liverpool, N.Y., and Paul T. Coté, Cleveland Heights, Ohio, assignors to General Electric Company Continuation of abandoned application Ser. No. 820,186, Apr. 29, 1969. This application Jan. 25, 1971, Ser. No. 109,576
Int. Cl. F21k 5/02
U.S. Cl. 431—95 33 Claims

ABSTRACT OF THE DISCLOSURE

A sequencing static electronic flashing circuit used with a disposable array of *n* flash lamps (or flashbulbs) operates within several microseconds to flash one lamp in sequence each time the circuit is energized in time relation to the opening of a camera shutter, can be fabricated completely as a monolithic or hybrid integrated circuit, and by-passes open-circuited lamps. Each flash lamp except optionally the first is in series with a solid state switching device such as a gate controlled thyristor or a transistor. A D-C logic sequencing control circuit, implemented with constant voltage drop means and logic transistors, requires as conditions for turning on a switching device that the previous device be conducting and that the voltage across the preceding lamp terminals exceed a threshold voltage, whereby all previous control circuit paths are conducing. Current or light sensing operates a lockout to de-energize the sequencing control circuit to prevent multiple flashes, and in another embodiment the sequencing is initiated by an external pulse and the circuit is energized only during the duration of the pulse. The start of sequencing after energizing the circuit and de-energization thereof independent of the shutter actuated switch can be controlled either by modifications within the sequencing flashing circuit or by external timer circuits that operate a static switch.

This application is a continuation of application S.N. 820,186 filed Apr. 29, 1969.

Static electronic circuits for selectively and sequentially flashing multiple photoflash lamps are disclosed and claimed broadly in application Ser. No. 784,093, filed Dec. 16, 1968 by John D. Harnden, Jr. and William P. Kornrumpf, entitled "Static Electronic Photoflash Assembly and Method of Photoflash Lighting," and assigned to the same assignee as the present invention.

This invention relates to static electronic flashing circuits for sequentially flashing individual lamps in an array of photoflash lamps or flashbulbs, and more particularly to improved sequencing flashing circuits that are constructed without the use of timing capacitors and preferably, though not exclusively, fabricated as monolithic or hybrid integrated circuits.

When taking pictures with a camera under conditions requiring artificial light, it was formerly the common practice to have a flash accessory with only one flashbulb socket and to manually replace a burned out bulb with an unused bulb each time a frame of film was exposed. As a subsequent development it was proposed to arrange several flashbulbs or photoflash lamps in a unitary package and mechanically or electrically switch from one flash lamp to another between frames. The presently popular flash cube, for example, comprises four flash lamps and their reflectors facing toward the four sides of the cube, with provision for rotating the cube as the film advance is actuated to place an unused lamp in position to be fired. The flash cube is disposable after using all the flashes. In another system there is a linear array of stationary flash lamps, with the switching between lamps being accomplished by a solenoid or an electromechanical stepping relay. The burned out lamps in this arrangement are replaced individually. Although offering some improvement, the speed of mechanically or electromechanically switching from one flash lamp to the next is relatively slow, in the order of one-fifth of a second to five seconds, as compared to the camera shutter open interval for flash photography, about one-thirtieth to one-fiftieth of a second. Consequently, a rapid sequence of exposures cannot be made and is a particular disadvantage when the pose or subject matter being photographed, such as a child's smile or a falling object, changes rapidly and cannot readily be recaptured. There is further some degree of unreliability because of the sliding contacts employed when making electrical connection to the next unused lamp. All of these prior art approaches, moreover, result in losing the picture, both in terms of ruining the frame of film and missing transitory subject matter, when the flash lamp is faulty because of internal defects, such as having an open circuit or short-circuited connection, or being a non-hermetically sealed lamp known as an air lamp that produces no usable light output. While certain existing cameras have provision for sensing some types of defective lamps before the picture is taken, these designs usually lock out the exposure mechanism to prevent under-exposing the film.

The static electronic flashing circuits disclosed broadly in the above-referenced Harnden and Kornrumpf application Ser. No. 784,093 provide a significant improvement in the art of flash photography. By employing static electronic switching techniques, the identification and enabling of the next unflashed lamp in the array to be flashed is performed at high speed in a time interval a magnitude or more shorter than the typical camera shutter open period of one-thirtieth of a second (thirty milliseconds). In some embodiments of the circuit, switching from one lamp to the next in the array is done so rapidly that all of the lamps in the array can be flashed sequentially while the camera shutter remains open, although normally the sequencing is interrupted when one or more lamps, if more light is needed, have flashed. The lamps in the array are mounted linearly or in a suitable planar arrangement, and electrical contact is made to all of the lamps simultaneously, thus eliminating the objectionable sliding contacts of prior art arrays. Consequently, the repetition rate at which a series of frames of film can be exposed is no longer limited by the interval required to make connection to the next lamp in the array. Because of the high switching speeds, open-circuited lamps are automatically by-passed and the next lamp in the array is flashed without loss of the exposure. In more advanced versions of the circuit, all types of defective lamps can be by-passed and there is guaranteed flash capability. The guaranteed flash circuits are discussed in application Ser. No. 793,636, filed Dec. 16, 1968, by William P. Kornrumpf and Paul T. Coté, entitled "Solid State Circuits for Guaranteed Sequential Flashing of Photoflash Lamp Array," and assigned to the same assignee as the present invention. The static electronic flashing circuits are most commonly implemented with solid state semiconductor devices and fabricated as monolithic or hybrid integrated circuits, thereby having the advantage of small size, increased reliability, and the potential of being relatively low cost. There are other incidental advantages, such as being independent of the film advance so that special effects obtained by double exposing the film can be achieved. Circuits using other types of components are described in application Ser. No. 784,094 by John D. Harnden, Jr. and Paul T. Coté filed Dec. 16, 1969, now Pat. No. 3,532,931 entitled "Photoflash Assembly for Sequentially Flashing Lamps Utilizing Voltage and Current Responsive Devices," and assigned to the same assignee as this invention.

While a variety of static electronic components are available to construct the new static electronic flashing circuits, the most satisfactory approach until the present invention employs solid state switching devices such as thyristors in series with each flash lamp in the array, except possibly the first lamp which is connected in series with a resistor and is flashed automatically when power is applied in response to actuation of the shutter release by the photographer. The thyristors are arranged to be rendered conductive in sequence at selected staggered time intervals by means of variable charge rate series RC gating circuits. Upon closing the camera shutter actuated switch, the device associated with the second lamp in the array is gated on before the other gating circuits charge to the threshold gating value, and current sensing is utilized to detect the in-rush current to flash the second lamp and inhibit further charging of the other gating circuits, thereby stopping the sequencing so that additional lamps are not flashed. A burned out lamp exhibits an open circuit characteristic and is by-passed, and the remaining lamps are flashed sequentially uopn subsequent actuations of the shutter release. Circuits of this type, and modifications thereof, are described more fully in application Ser. No. 784,067 by John D. Harnden, Jr., William P. Kornrumpf, and Robert A. Marquardt, filed Dec. 16, 1968, now abandoned, entitled "Sequential Flashing of Multiple Flash Lamps by Low Cost Static Control Circuit of Integrated Design," and assigned to the same assignee as this invention. Some embodiments show a plurality of timing capacitors for the series RC gating circuits, specifically one for each thyristor except the first. Other embodiments show a single timing capacitor with the threshold level differentiation achieved by different resistor values and/or different numbers of diodes in the charging path to achieve a selected voltage drop.

Although the just mentioned preferred static electronic flashing circuits employing thyristors or other devices with a latching characteristic and variable charge rate series RC gating circuits are designed to be fabricated as monolithic or hybrid integrated circuits, in practice the area required by the single or several timing capacitors on the integrated circuit chip makes this circuit concept at present appear to be uneconomical. Furthermore, there may be some difficulty when mass producing the circuits with the tolerances on the resistors and capacitors in the variable charge rate circuits, with the result that satisfactory staggering of turn-on of the thyristors may not be maintained. To overcome these difficulties, as well as to obtain certain other improvements in speed of operation and cost considerations, the present invention was devised.

Accordingly, an object of the invention is to provide new and improved static electronic flashing circuits for sequentially flashing an array of photoflash lamps in response to repeated actuations of a camera shutter release, wherein the flashing circuits employ solid state switching devices and are constructed without the use of timing capacitors.

Another object is to provide improved sequencing flashing circuits that sequence through an array of flash lamps at high speed, and are capable of low cost fabrication as monolithic or hybrid integrated circuits.

Yet another object is improved high speed flashing circuits for use in flash photography that have considerable inherent flexibility as to controlling the start of the sequencing and the interval during which the sequencing circuit remains energized.

A further object is the provision of a high speed static sequencing flashing circuit that is free of the contact bounce problems sometimes associated with mechanical contacts.

A still further object is to provide an improved static sequencing circuit for use in flash photography having the capability of initiating the sequencing either as a result of actuating a camera shutter release, or electronically by means of an independently produced electrical signal at a predetermined time following actuation of the shutter release.

In accordance with the invention, an improved sequencing static electronic flashing circuit for sequentially flashing an array of $n$ replaceable flash lamps comprises a plurality of lamp circuits arranged in the predetermined order of first to last and each, except optionally the first, including a static electronic switching means in series with a pair of lamp terminals. The lamp circuits are connected parallel to one another between a pair of power supply terminals for connection with circuit energizing means that is operative repetitively to couple the circuit across a source of electric potential and subsequently decouple the circuit after a time interval. Sequencing control means coupled with all of the lamp circuits is provided to render conductive the lamp circuits in sequence to supply current to a respective one of the flash lamps each time the power supply terminals are energized. The sequencing control means comprises means for initially supplying current to the first lamp circuit, and further comprises threshold logic control means connected across each pair of lamp terminals, except those in the last lamp circuit, that is conductive only when the voltage across that pair of lamp terminals exceeds a threshold voltage to supply a turn-on signal to the succeeding switching means in the next lamp circuit. Turn-off means de-energizes the sequencing control means when current is supplied to a continuous lamp filament or after a lamp is flashed. In the preferred embodiments, the lamp circuit static electronic switching means is a solid state switching device with a control electrode such as a gate controlled thyristor or a transistor. The threshold logic control means comprises constant voltage drop means and a solid state logic switching device with a control electrode, preferably a transistor.

The foregoing and other objects, features, and advantages of the invention will be apparent from the following more particular description of several preferred embodiments of the invention, as illustrated in the accompanying drawings wherein:

FIG. 1 is a schematic circuit diagram of a simplified version of the improved sequencing static electronic flashing circuit constructed in accordance with the invention and suitable for fabrication with discrete components;

FIGS. 1*a* and 1*b* show modifications of the FIG. 1 circuit in which, respectively, the switching device in the first lamp circuit is replaced by a resistor, and current sensing to operate the lockout circuit is replaced by light sensing;

Figure 2:
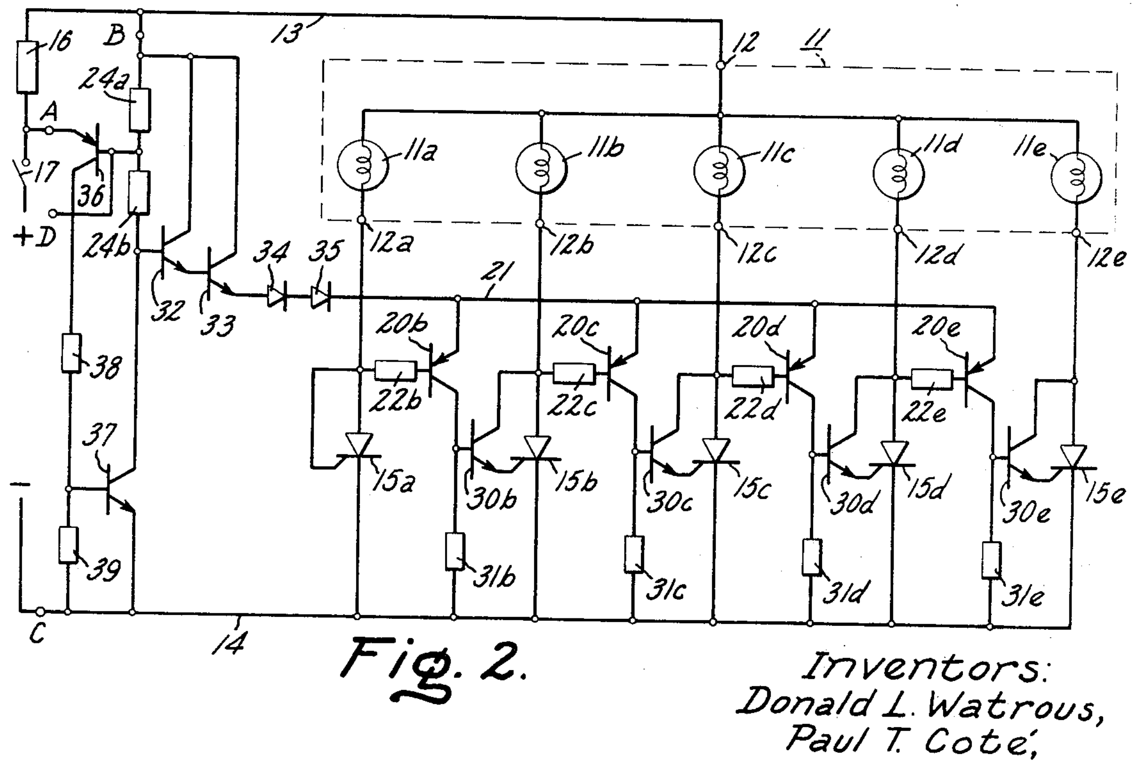
FIG. 2 is a schematic circuit diagram of the preferred embodiment of the new sequencing flashing circuit that is capable of fabrication substantially in its entirety as a monolithic or hybrid integrated circuit.
Figure 3:
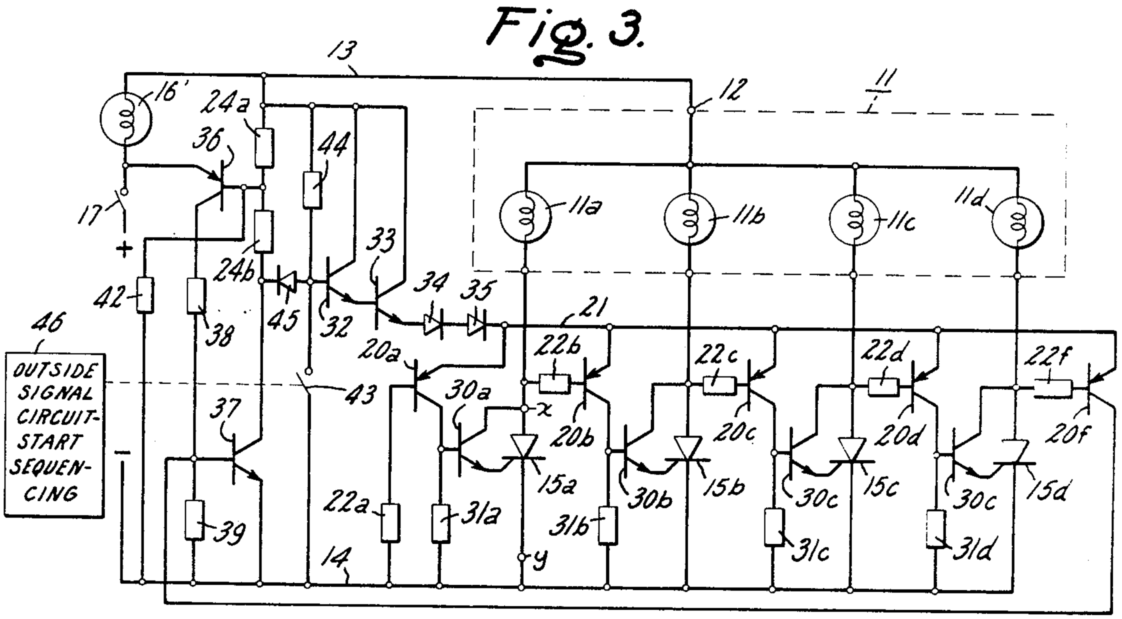
FIG. 3 shows various modifications of the preferred circuit of FIG. 2 that can be included individually or in any desired combination.
Figure 3A:
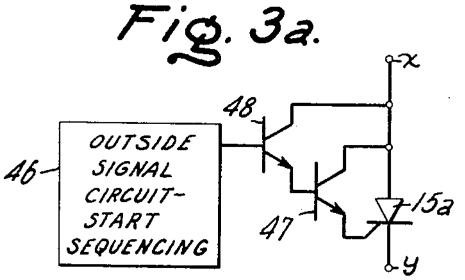
Figure 3B:
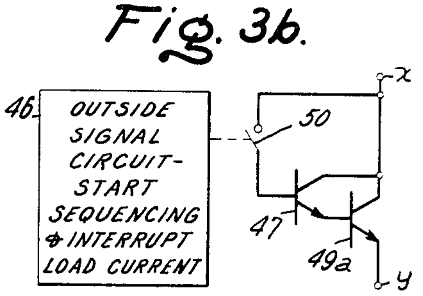
Figure 4:
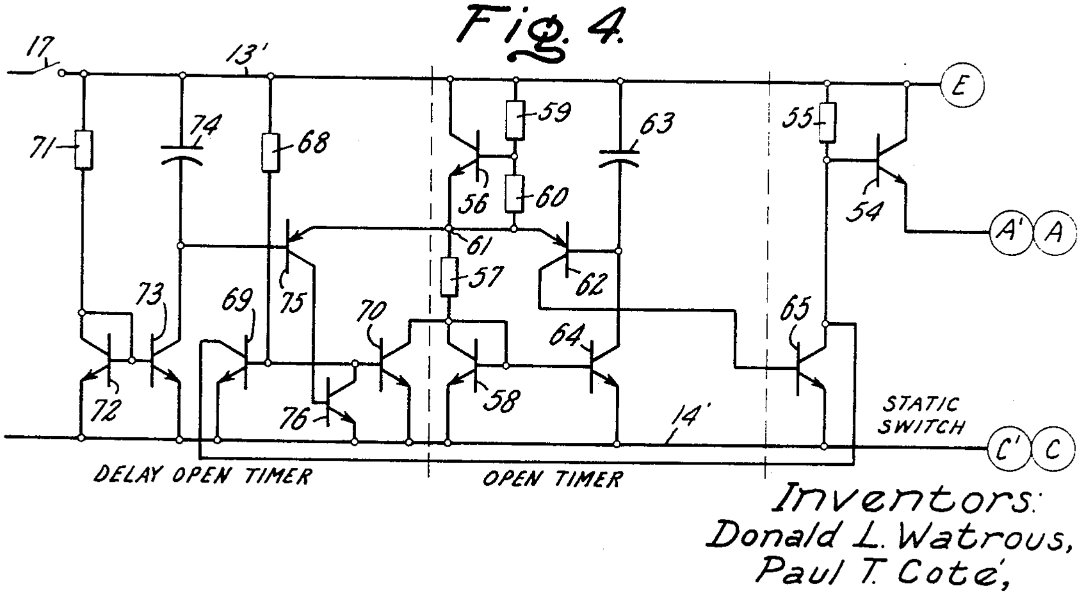
Figure 5:
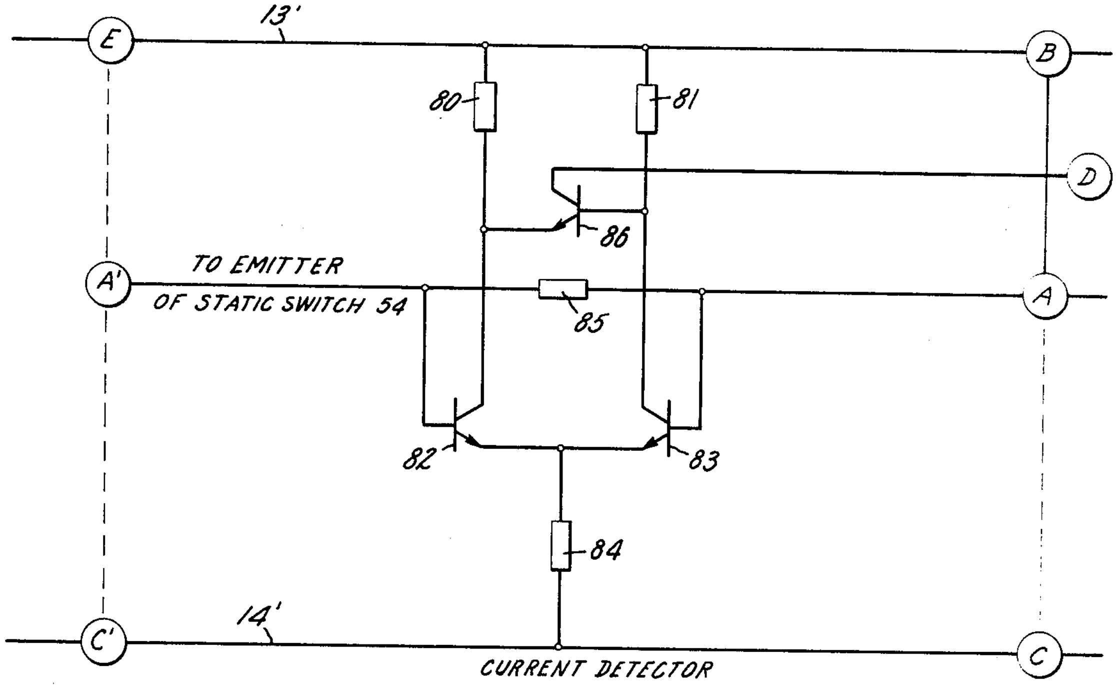
Figure 6:
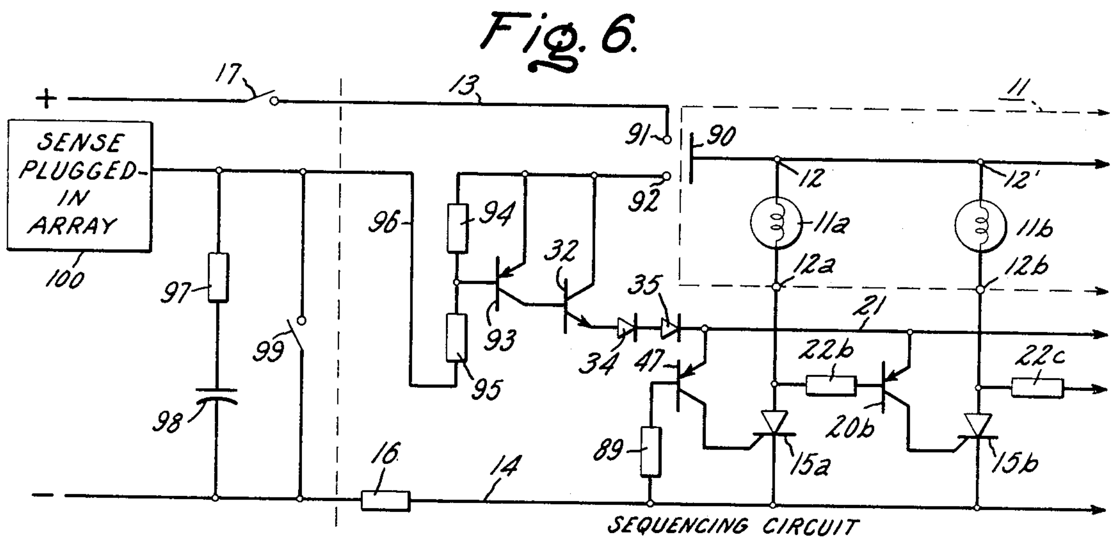

FIGS. 3*a* and 3*b* illustrate additional modifications of the preferred circuit of FIG. 2 obtained by inserting the modified circuits between the points $x$ and $y$ in FIG. 3;

FIG. 4 is a schematic circuit diagram of additional circuitry external to that of FIG. 2 including an optional delayed open timer section for delaying application of power to the sequencing circuit; an open timer section for applying power to the sequencing circuit for a predetermined time interval; and a static switch replacing the mechanical switch in FIG. 2;

FIG. 5 is a schematic circuit diagram of an additional circuit section to be used between the FIG. 4 circuit and its connection to FIG. 2 when it is desired to use the static switch of FIG. 4 but the source voltage is such that the voltage drop across the static switch transistor and the current sensing resistor in FIG. 2 cannot be tolerated; and FIG. 6 shows still another embodiment of the invention designed to eliminate the problem of false actuation of the sequencing circuit due to random contact bounce upon opening the mechanical camera shutter actuated switch, and in which the sequencing is initiated by a pulse from an outside signal circuit for use in those camera systems where it is desired to initiate the sequencing electronically.

The static electronic flashing circuits constructed in accordance with the invention for sequentially flashing multiple photoflash lamps or flashbulbs is used with an array of *n* flash lamps, wherein *n* is any number greater than two. In the embodiment of the invention shown in FIG. 1, which is a simplified version of the new sequencing flashing circuit suitable for fabrication with discrete components, an array of four flash lamps 11*a*–11*d* is illustrated by way of example. The photoflash lamps 11*a*–11*d* can be any of the known commercially available flash lamps such as the General Electric AG–1 lamp manufactured and sold by the Photolamp Department of the General Electric Company, located at Nela Park, Cleveland, Ohio, and which is further described in U.S. Pat. No. 2,982,119 to Anderson, issued May 2, 1961, and assigned to the General Electric Company. Upon being flashed or burned out by the passage of sufficient load current through its filament, these flash lamps normally exhibit an open circuit characteristic. The flash lamps 11*a*–11*d* are removably plugged either singly or as a unitary array into a pair of lamp terminals for each lamp, one set of terminals being indicated by the numerals 12*a*–12*d*, whereas the other set is identified by numerals 12–12'''. Preferably, the four flash lamps 11*a*–11*d* are packaged as a disposable unitary array in which the lamps are mounted linearly or in a planar configuration. A suitable disposable linear or planar array is described more fully in application Ser. No. 784,075 by John D. Harnden, Jr. and William P. Kornrumpf filed Dec. 16, 1968, now Pat. 3,598,985 issued on Aug. 10, 1971, entitled "Construction of Disposable Photoflash Lamp Array," and assigned to the same assignee as the present invention. In the event that such a disposable array is employed, rather than singly replaceable lamps, it will be recognized that the one set of terminals 12–12''' can be common.

The four flash lamps 11*a*–11*d* are respectively connected in four series lamp circuits that extend in parallel circuit relationship to one another between a pair of D-C supply terminals 13 and 14. In order to control the application of current to the individual lamps so that they can be flashed in time sequence, each of the lamp circuits includes an appropriate solid state switching device 15*a*–15*d*, and is more specifically a gate controlled solid state switching means with a latching characteristic such as a thyristor device. In this embodiment, the devices 15*a*–15*d* are silicon controlled rectifiers having their cathodes connected in common to the negative D-C supply terminal 14. SCR 15*a* in the first lamp circuit can be replaced by a resistor 15' as shown in FIG, 1*a*, but the use of an SCR is preferable because the currents in the several lamp circuits are then balanced. The silicon controlled rectifier is also known as a gate controlled thyristor and is a well-known semiconductor switching device which can be rendered conductive when its anode voltage is positive with respect to its cathode and upon the application of a gating signal to its gate electrode, but thereafter the gate electrode loses control over conduction through the device and to commutate or turn it off, it is necessary to reduce the current through the device to a value below the holding current or to make the anode potential negative relative to the cathode potential. The silicon controlled rectifier is further described in the Silicon Controlled Rectifier Manual, 4th edition, published by the General Electric Company, Semiconductor Products Department, Syracuse, N.Y., copyright 1967.

While the use of the gate controlled silicon controlled rectifier is preferred, other suitable solid state or static electronic switching devices can be used with appropriate circuit modifications, such as the complementary silicon controlled rectifier (CSCR), a transistor, a pair of transistors connected in such manner that the combination has thyristor characteristics, a unijunction transistor (UJT), a silicon controlled switch (SCS), a silicon unilateral switch (SUS), or the programmable unijunction transistor (PUT). The latter two devices are low power anode-gated thyristor devices having circuit connections in which the anodes are connected together in common, rather than the cathodes as with the SCR, and thus require a converse circuit arrangement. These devices are described in the aforementioned SCR Manual, and for further information on the silicon unilateral switch and the programmable unijunction transistor, reference may be made to the aforementioned Kornrumpf and Coté application Ser. No. 793,636.

Each of the lamp circuits comprising one of the flash lamps 11*a*–11*d* and one of the SCR thyristors 15*a*–15*d* is connected through a current sensing and current limiting resistor 16 and a pair of physically separable camera shutter actuated electrical contacts 17 across the terminals of a dry cell battery 18 or other suitable low energy source of electric potential. Although as illustrated the camera actuated shutter switch 17 and current sensing resistor 16 are connected between the positive terminal of battery 18 and the positive D-C supply terminal 13, either one or the other or both can be connected to the same effect between the negative terminal of the battery and the negative D-C supply terminal 14. The mechanical camera shutter actuated switch 17 is normally open, and is closed either directly or indirectly with or without a time delay as a result of actuating the camera shutter release 19. The energization of the sequencing flashing circuit is consequently coordinated with the opening of the camera shutter which is initiated by the user pressing the camera release 19 when it is desired to take a picture. The closing of the switch 17 is for instance timed to coincide with the start of the shutter opening, however it will be realized that other types of flash synchronization can be accommodated. In addition to being independent of the type of flash synchronization, the invention is also not limited to any particular type of camera or shutter system, and can be used with either a diaphragm shutter or a focal plane shutter. Moreover, in certain types of cameras, as, for example, those with automatic exposure control, there may be two of the mechanical switches 17 connected in series with one another, one of which closes when the shutter release 19 is actuated while the other closes at a later time. As will be more apparent later, the mechanical camera shutter actuated switch 17 can also be replaced by a solid state static switch such as a transistor or an SCR. Any of these modifications of the single set of physically separable contacts 17 that is illustrated do not affect the basic operation of the sequencing circuit.

The D–C logic sequencing control means for supplying the gating signals to the SCR devices 15*a*–15*d* to render them conductive in sequence each time the circuit is energized, and thereby achieve the circuit objective of flashing one lamp at a time in sequence in response to repeated actuations of the shutter release 19, will now be explained. The gating circuit for the first SCR 15*a* in series with the first lamp 11*a* in the array is connected to automatically turn on the device or render it conductive when power is applied. This is accomplished by connecting the gate electrode directly to the anode load terminal, although other techniques are available. The threshold logic control means for the remaining three stages or channels are identical and include respective pnp transistors 20*b*, 20*c*, and 20*d*, each having its emitter load terminal connected to a common emitter bus 21 and its collector load terminal connected to the gate electrode of its associated SCR device. Instead of a transistor, a suitable solid state switching device with a control electrode can be used, such as an anode-gated thyristor and in particular an anode-gated silicon control switch. Resistors 22*b*, 22*c*, and 22*d* are respectively connected between the base of its associated logic transistor and the anode of the SCR device in a previous lamp circuit. The threshold logic control means is completed by a Zener diode 23 connected to the common emitter bus 21 and through a resistor 24 to the D-C positive supply terminal 13. It will be observed that a threshold logic control circuit comprising elements 24, 23, and 20 and 22 with the appropriate suffix, is connected across each pair of lamp terminals except those in the final lamp circuit. Each respective threshold logic control circuit generates a turn-on signal for the succeeding switching device in the next lamp circuit.

Assuming that the flash lamps 11*a*–11*d* in the array are unflashed and are good lamps, i.e., non-defective, then, as was previously mentioned, upon the first closure of the camera actuated shutter switch 17, a circuit is completed through the first flash lamp 11*a* and the SCR 15*a* which is connected so as to automatically turn on. At this instant when the lamp 11*a* is initially supplied with current and begins to flash, the second SCR 15*b* in the second stage will not turn on because its associated logic transistor 20*b* is not rendered conductive. In order for the logic transistor 20*b* to turn on, it is necessary that the voltage across the threshold logic control circuit comprising the resistor 22*b*, the base-emitter junction of logic transistor 20*b*, the Zener diode 23, and resistor 24 exceed a predetermined threshold voltage. The voltage across this series connected circuit is seen to be identical to the voltage across the flashing lamp 11*a*, which at this point is relatively low since its resistance is low. As the filament of flash lamp 11*a* heats, its resistance increases until, in about 8 milliseconds, the filament opens up and the lamp becomes an open circuit. Prior to this time, as will be explained later, the D-C logic sequencing control circuit is de-energized, and thus the second SCR 15*b* cannot turn on at this time. When the shutter release 19 is subsequently actuated to apply power to the circuit for the second time, the first lamp 11*a* now has an open circuit characteristic, and since no appreciable current flows through resistor 16 there is sufficient voltage across the threshold logic control circuit comprising resistor 24, the Zener diode 23, the base-emitter junction of the logic transistor 20*b*, and the resistor 22*b* (SCR 15*a* is automatically rendered conductive) to turn on the logic transistor 20*b*. In order to render conductive logic transistor 20*b* there are two conditions, namely, (1) that the voltage across the previous open flashed lamp terminals exceeds a predetermined threshold value and (2) that the previous SCR be conducting. Logic transistors 20*c* and 20*d* at this point do not turn on because their respective previous SCR's 15*b* and 15*c* are not conducting. When logic transistor 20*b* conducts to supply a gating signal to the SCR 15*b*, rendering it conductive, then it is seen that logic transistor 20*c* still does not turn on because the required threshold voltage level does not appear (lamp 11*b* is beginning to flash). In order to trigger on the next SCR in sequence, all sequencing control circuit paths previous will be conducting. For example, to render conductive the SCR 15*c*, it is necessary that logic transistor 20*c* be turned on, which in turn requires that the SCR 15*b* be conducting, in turn requiring that logic transistor 20*b* be turned on, and that SCR 15*a* be conducting.

The current sensing resistor 16 is utilized to sense the application of current to a continuous lamp filament when one of the SCR's 15*a*–15*d* is turned on, and operates a lockout or inhibit circuit for de-energizing the D-C logic sequencing control circuit to prevent the unwanted triggering on of the next SCR in sequence when the resistance of the filament of lamp that is flashing increases to a high enough value while it is burning, or when it burns out and becomes open-circuited. The current in the sequencing control circuit, before one of the SCR's 15*a*–15*d* is rendered conductive, is at signal levels, and consequently the current flowing through the current sensing resistor 16 is relatively small. The resistance of the series lamp circuits is initially considerably lower, so that a much larger load level current flows through the current sensing resistor 16 when current is applied to a continuous lamp filament. In particular, the increased voltage drop produced across the current sensing resistor 16 due to the in-rush current is sensed by a gate controlled solid state switching device 25. Although other types of gate controlled solid state switching devices can be used, it is preferred to use an anode-gated thyristor such as a silicon controlled switch (SCS). The anode of the SCS 25 is connected to the junction between the current sensing resistor 16 and the camera actuated shutter switch 17, while the anode gate of the device is coupled through a resistor 26 to the other end of the current sensing resistor 16.

The silicon controlled switch (SCS) is a low power, tetrode thyristor that in reality is a small monolithic integrated circuit internally having a base-emitter junction connected between the anode and anode gate electrodes which must be forward biased in order to turn on the device. The cathode gate electrode in this case is left open-circuited. The SCS when connected in this manner uses a form of anode gating that requires that the anode be positive with respect to the cathode, while the anode gate electrode is negative with respect to the anode by at least one diode drop or 0.6 volt. The component and device values are chosen such that there is in excess of a 0.6 volt drop across the current sensing resistor 16 when the in-rush load current occurs, thereby turning on the SCS 25 to indicate the application of current to a continuous lamp filament. The cathode of the SCS 25 is connected through a resistor 27 to the base of an npn transistor 28 whose collector is connected to the junction of the Zener diode 23 and the resistor 24, and whose emitter is connected to the negative D-C supply terminal 14. The transistor 28 functions as a lockout or inhibit transistor and is rendered conductive to back bias the Zener diode 23 and de-energize the D-C logic sequencing control circuit whenever the SCS 25 turns on to sense the application of current to a continuous lamp filament. A suitable gate controlled thyristor such as an SCR can be employed in place of transistor 28.

Figure 1:
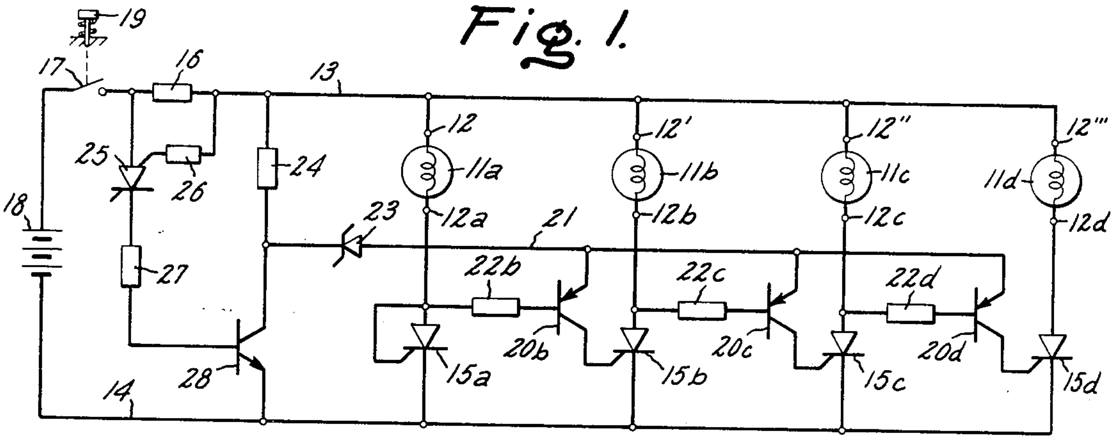
Figure 1A:
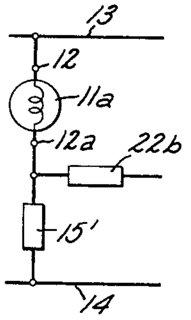

The operation of the simplified FIG. 1 circuit will now be reviewed. The sequencing flashing circuit is rendered operative by the photographer pressing down on the shutter release member 19 to thereby initiate the opening of the shutter and closing the camera actuated shutter switch 17 in time relation thereto. For flash photography the shutter typically remains open for one-thirtieth of a second or 30 milliseconds, and the shutter switch 17 remains closed throughout the entire shutter open interval and, depending upon the design of the camera, may remain closed until the photographer manually releases the shutter release member 19. Since the first SCR 15*a* is connected to be automatically gated on, the appearance of voltage across the first lamp circuit including flash lamp 11*a* and SCR 15*a* results in rendering conductive the SCR 15*a* and applying load level current to the filament of the flash lamp 11*a*. At this time, when the lamp 11*a* begins to flash, the voltage across the lamp is less than the predetermined threshold voltage level required to turn on the logic transistor 20*b*. As was previously explained, the voltage across the terminals of lamp 11*a* is the same as the voltage across the series circuit in the D-C logic sequencing control circuit comprising the resistor 24, the Zener diode 23, the emitter-base junction of logic transistor 20*b*, and the resistor 22*b*. The portion of the total voltage appearing across the emitter-base junction of transistor 20*b* is less than that required to forward bias this junction, and hence the transistor does not turn on. When load current flows through the flash lamp 11*a*, the voltage drop across the current sensing resistor 16 due to the in-rush current is sensed by the SCS 25, which turns on to indicate the application of current to a continuous lamp filament. The turning on of the SCS 25 forward biases the lockout or inhibit transistor 28, establishing a path for current flow through the resistor 24 and the transistor 28. There is consequently no current flow through the Zener diode 23 and the common emitter bus 21, and the D-C logic sequencing control circuit thereafter remains de-energized. After about 8 milliseconds or so, the filament of the flash lamp 11*a* burns out and is open-circuited, thereby commutating off the SCR 15*a* since the current through the device drops below the holding value. Current flow thereafter is through the lockout circuit branch including the resistor 24 and transistor 28. Upon the opening of the camera shutter actuated switch 17, SCS 25 and lockout transistor 28 turn off.

Upon the second actuation of the shutter release 19 to expose another frame of film, signal level current flows through the current sensing resistor 16 and the D-C logic sequencing control circuit. Lamp 11*a* is now open-circuited, however there is a continuous circuit for current through the resistor 24, the Zener diode 23, the emitter-base junction of logic transistor 20*b*, the resistor 22*b*, and the gate-cathode of the SCR 15*a*, which automatically turns on. The voltage drop across the terminals of open lamp 11*a* now exceeds the predetermined threshold level, and there is more than 0.6 volt voltage drop across the emitter-base junction of transistor 20*b*, so that transistor 20*b* is rendered conductive and applies a gating signal to the gate electrode of the second lamp circuit SCR 15*b*, turning it on. By way of example, although it will be understood that the invention is not limited to these values, the battery 18 has a voltage of about 6 volts and the threshold voltage level across the terminals of an open lamp required to turn on a logic transistor is about 4 volts. The voltage across a flashing lamp is much less, in the order of 1 to 1.5 volts. The margin of safety between the threshold voltage and the initial voltage across a flashing lamp, in this case 2.5–3 volts, is determined by the value of current limiting resistor 16. If series resistor 16 were eliminated, there would be too small a difference and the circuit would have a tendency to ripple through the array of lamps. When the second lamp circuit SCR 15*b* is rendered conductive, the flow of load level current through the filament of the flash lamp 11*b* is sensed by the SCS 25, which in turn renders conductive the lockout transistor 28. The first stage SCR 15*a* turns off due to the de-energization of the sequencing control means, and the second stage SCR 15*b* turns off when its associated flash lamp 11*b* becomes open-circuited. Upon closing the camera shutter actuated switch 17 a third time, the first stage SCR 15*a* is initially rendered conductive in the manner previously explained, and since the lamp 11*a* is open-circuited, the logic transistor 20*b* next turns on to apply a gating signal to the second stage SCR 15*b*. In the same manner a voltage exceeding the threshold voltage appears across the open-circuited lamp 11*b*, and the third stage logic transistor 20*c* is rendered conductive to apply a gating signal to the third lamp circuit SCR 15*c* to cause current flow through the third flash lamp 11*c*. Upon actuating the shutter release member 19 the fourth time, the entire D-C logic sequencing control circuit is operative and results in turning on the fourth stage logic transistor 20*d* to apply a gating signal to the fourth lamp circuit SCR 15*d*.

As was previously mentioned, there are occasionally defective flash lamps in the array, and it is necessary to analyze the action of the sequencing circuit with each of the three types of defective lamps, namely, the open-circuited lamp, the flashed short-circuited lamp, and the air lamp. Open-circuited lamps have no effect on the operation of the circuit, are automatically by-passed when reached in the normal sequence, and do not cause a malfunction. Let it be assumed that the third stage lamp 11*c* is an open-circuited lamp either by reason of an internal defect or by reason of having already been flashed. Upon the first energization of the circuit after having replaced the lamps 11*a*–11*d*, the sequencing control circuit operates to flash only the first stage lamp 11*a*, and will not also cause the fourth stage lamp 11*d* to be flashed. The fourth stage lamp 11*d* is not flashed because the sequencing control circuit operates to turn on only the first stage SCR 15*a*. Logic transistor 20*d* is not rendered conductive to supply a gating signal to the fourth stage SCR 15*d* because the third stage SCR 15*c* is not turned on by the sequencing logic, and thus one of the two conditions for gating on an SCR is missing, these being that the previous SCR is conducting and that there is enough voltage in the control logic to turn on the associated transistor. When the circuit is next energized after having flashed the lamps 11*a* and 11*b*, the sequencing control circuit operates in the normal manner to successively turn on the SCR's 15*a*, 15*b*, and 15*c*. At this point the lamp 11*c* appears as an open circuit, and there is enough voltage in the control logic to turn on the fourth stage logic transistor 20*d*, thereby rendering conductive the fourth stage SCR 15*d*. The D-C logic sequencing control circuit operates very rapidly, since the only delays are the delays to turning on the various active devices. Even if the first three flash lamps 11*a*, 11*b*, and 11*c* are open-circuited, the fourth lamp 11*d*, which is assumed to be a good lamp, will be energized in less than 1.5 microseconds.

The flashed short-circuited lamp ignites and produces a usable light output, but becomes permanently short-circuited after flashing when the molten filament mount and/or zirconium foil material falls on the filament holders, bridging across them, and subsequently solidifies. A flashed short-circuited lamp will thereafter cause the circuit to malfunction, since the D-C logic sequencing control circuit does not operate past the flashed short-circuited lamp. Thus, subsequent flash lamps, even if good lamps, will not be flashed. The non-hermetically sealed lamp or air lamp acts electrically like a good lamp but takes a longer time to burn out and does not produce a usable light output. Upon applying current to the filament of an air lamp, the current sensing resistor 16 senses the in-rush current in the same manner as for a good lamp, resulting in turning on the SCS 25 and the lockout transistor 28. Provided that the camera actuated shutter switch 17 is closed for a sufficient period of time to burn out the air lamp, continued current flow through the filaments of the air lamp will eventually burn it out. On the next operation of the sequencing circuit, the air lamp appears as an open circuit, and the sequencing control circuit is operative in the same manner as if it had been a good lamp. Thus, although the air lamp does not produce a usable light output and the frame of film is under-exposed, the subsequent lamps can be flashed when the next exposures are made.

Figure 1B:
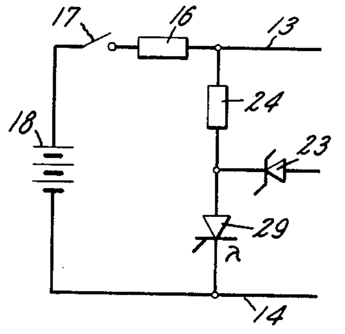

By using light sensing to operate the lockout circuit when a lamp is flashed, rather than using current sensing to activate the lockout circuit in response to the passage of load current through a continuous lamp filament as is taught in FIG. 1, the sequencing circuit will automatically by-pass an air lamp and flash the next lamp in the array. There is no change of operation with good lamps and flashed short-circuited lamps. This circuit modification is illustrated in FIG. 1*b*. Resistor 16 is used only to limit the circuit current and provide a safety of margin for operation of the threshold voltage logic as was previously explained, consequently in-rush current sensing elements 25–27 in FIG. 1 are not needed. Lockout transistor 28 is replaced by a thyristor device that is rendered conductive by the impingement on it of light, such as a light activated silicon controlled rectifier 29. LASCR 29 is connected in series with resistor 24 between supply terminals 13 and 14. The light activated silicon controlled rectifier is a four-layer thyristor similar in structure to the common silicon controlled rectifier, but it is gated to its conducting state by incident radiant energy within the spectral bandwidth of silicon that impinges on and penetrates into the silicon lattice and releases a considerable number of holeelectron pairs. The resulting current is sufficient to trigger the device provided that the anode electrode is biased positive relative to the cathode. Alternatively, a light activated silicon controlled switch can be used as the light sensing thyristor.

In operation, the flashing of a good lamp is sensed by LASCR 29 and renders it conductive to de-energize the sequencing control circuit by reverse biasing Zener diode 23. LASCR 29 remains latched on until shutter switch 17 opens and reduces the current below the holding value. Light sensing is not as fast as current sensing, which is almost instantaneous, however, it is sufficiently fast that LASCR 29 is triggered before the resistance of the flashing lamp increases to the point where the voltage across its lamp terminals reaches the threshold voltage level of the threshold logic control circuit connected across those lamp terminals. An air lamp does not flash and thus cannot trigger LASCR 29. As the air lamp burns, its resistance increases gradually until the resistance is high enough that the voltage across its lamp terminals exceeds the threshold voltage at which the associated logic control circuit is activated to turn on its respective logic transistor and supply a gating signal to the next succeeding SCR. The next lamp in sequence, assuming it is a good lamp, flashes and produces a light output to now trigger LASCR 29 and prevent further sequencing. This series of events occurs within the normal shutter open interval for flash photography of 30 milliseconds. For further information on the change of resistance of a good lamp and an air lamp during flashing, reference is made to the current-time characteristic of FIG. 3 and the discussion in the aforementioned Kornrumpf and Coté application Ser. No. 793,636.

FIG. 2 shows the preferred embodiment of the invention which is implementable in its entirety as a monolithic integrated circuit or as a hybrid integrated circuit. It may be desirable for some applications to provide the current sensing resistor 16 as a discrete component, especially since the value of current sensing resistor 16 may change from one camera model to another, but it will be understood that resistor 16 can be formed monolithically if desired. This embodiment uses a photoflash lamp array comprising five flash lamps **11*a*–11*e*. The several flash lamps are packaged as a unitary disposable array of the type described in the aforementioned Harnden and Kornrumpf application Ser. No. 784,075, and is pluggable into a socket containing the five lamp terminals 12*a*–12*e* and the common lamp terminal 12. The sequencing flashing circuit accordingly has an additional fifth stage lamp circuit comprising the SCR 15*e* in series with lamp 11*e*, and the associated logic transistor 20*e* and resistor 22*e* connecting the base of transistor 20*e* to the anode of the previous SCR 15*d*. The D-C logic sequencing control circuit includes in each of the stages or channels except the first an additional logic transistor identified respectively as transistors 30*b*–30*e*. These additional logic transistors are npn transistors, and are provided to increase the current gain of the gating signal. Referring to the second stage, the collector of original logic transistor 20*b* is connected to the base of the additional current gain logic transistor 30*b*, and the emitter of transistor 30*b* is connected to the gate electrode of the SCR 15*b*. The collector of logic transistor 30*b* is connected directly to the anode of SCR 15*b*, since in this way current is available when it is needed and is not present when it is not needed, however the collector of transistor 30*c* can also be connected to the D-C supply terminal 13 or to the common emitter bus 21. Bias resistor 31*b* is inserted between the base of transistor 30*b* and the negative D-C supply terminal. With this arrangement, when logic transistor 20*b* is rendered conductive, the additional logic transistor 30*b* also conducts and supplies a higher current gain gating signal to the gate electrode of SCR 15*b***. The outer logic stages have identical added circuitry.

In this FIG. 2 circuit, the function of the Zener diode

23 in the D-C logic sequencing control circuit in the FIG. 1 embodiment is provided by constant voltage drop means comprising a pair of npn transistors 32 and 33 connected in a Darlington emitter-follower configuration, and two series connected diodes 34 and 35. More particularly, the collectors of the transistor pair 32, 33 are connected together to positive supply terminal 13, with the emitter of transistor 32 connected to the base of transistor 33, and the emitter of transistor 33 connected in series with the two diodes 34 and 35 which are in turn are connected to the common emitter bus 21. With this arrangement, as will be explained in detail later, rendering conductive the transistor 32 biases the transistor 33 into conduction and forward biases the two diodes 34 and 35. The collective effect of the four series diode drops is equivalent to that of the Zener diode 23 in FIG. 1.

The voltage drop across the current sensing resistor 16 produced as a result of the in-rush current to a flash lamp filament is sensed by means of a pnp transistor 36 having its emitter connected to the positive end of the resistor 16 while its base is connected through a bias resistor **24*a* to the negative end of resistor 16. The transistor 36 for sensing the application of current to a continuous lamp filament is associated with another npn lockout transistor 37 in a latching arrangement with positive feedback. For this purpose, the collector of transistor 36 is connected through a current limiting resistor 38 and a bias resistor 39 to the negative D-C supply terminal 14. The base of lockout transistor 37 is connected directly to the junction between the resistors 38 and 39, its emitteer is connected directly to the negative D-C supply terminal 14, and its collector is connected through an additional resistor 24*b* to the base of transistor 36. When sensing transistor 36 is rendered conductive by the voltage drop produced across the sensing resistor 16 by the in-rush current through it, lockout transistor 37 is also rendered conductive and latches on due to positive feedback. To complete the description of the structure of the FIG. 2 embodiment, the collectors of the two Darlington configuration transistors 32, 33 are connected to the positive D-C supply terminal 13, while the base of transistor 32 to provide bias is connected to the junction of resistor 24*b* and the collector of latching transistor 37. When transistors 36 and 37 are conducting , this transistor pair provides the lockout or inhibit function for the D-C logic sequencing control circuit, since the base of transistor 32 is driven to the potential of the negative D-C supply terminal 14, thereby turning off the transistors 32 and 33 and removing voltage from the common emitter bus 21**.

The operation of the preferred circuit of FIG. 2 is essentially the same as has been described for the FIG. 1 circuit, and will only be mentioned to the extent to clarify the operation of the new structure. Upon the first closure of the camera shutter actuated switch 17, the appearance of voltage across the first series lamp circuit comprising lamp **11*a* and SCR 15*a* automatically turns on SRC 15*a* in the same manner as before. Logic transistor 20*b* does not turn on to supply a gating signal through the additional logic transistor 30*b* to the gate of the second stage SCR 15*b* because there is insufficient voltage in the control logic. That is, the voltage across the terminals of the conducting flashing lamp 11*a*, which is the same as the voltage across the series logic control circuit comprising transistors 32, 33, diodes 34 and 35, the emitter-base junction of logic transistor 20*b*, and resistor 22*b*, is below the threshold voltage. As soon as the lamp 11*a* conducts current, the in-rush current produces a voltage drop across the current sensing resistor 16 that turns on the sensing transistor 36 and the latching transistor 37. Consequently, transistors 32 and 33 are rendered non-conducting and there is no voltage on the common emitter bus 21. Latching lockout transistor pair 36, 37 return to their non-conducting state when the shutter switch 17 is opened. On the next closure of the shutter switch 17, transistors 32 and 33 in the sequencing control circuit are rendered conductive by base drive through resistors 24_a_ and 24_b_. Since the lamp 11_a_ is now an open circuit, there is sufficient voltage across transistors 32, 33, diodes 34 and 35, the emitter-base junction of logic transistor 20_b_ and resistor 22_b_, to forward bias the logic transistor 20_b_. Thus added logic transistor 30_b_ also turns on to supply a gating signal to SCR 15_b_, rendering it conductive to apply load current through the filament of the second flash lamp 11**_b_. The operation proceeds as before to sense the application of current to the lamp filament and operate the lockout for the sequencing control circuit. Further explanation of the operation of the FIG. 2 circuit is not thought to be necessary.

A number of modifications of the FIG. 2 circuit will be discussed with reference to FIG. 3 wherein, because of space limitations on the drawing, a four-lamp array 11 is illustrated rather than the preferred five-lamp array. These modifications can be used either individually or in any selected combination. It will be recalled that a flashed short-circuit lamp causes a malfunction or "hang-up" of the FIG. 1 or FIG. 2 circuit, since the sequencing control circuit will not operate beyond the short-circuited load whereby the remaining flash lamps cannot be flashed. The first modification provides a visual indication of a flashed short-circuited lamp so that the photographer can remove the lamp array 11 and replace it by another array. To accomplish this, the current sensing resistor 16 is replaced by an ordinary small light bulb 16' having a filament mass selected so that the bulb 16' will not light under normal operation of the circuit but will light up when a flash lamp fails short and there is current flow through the indicator bulb 16' for a sufficiently long period. When the indicator bulb 16' lights up, the photographer is warned that he should replace the array 11. Bulb 16' lights up during the picture taking cycle when the flash lamp flashes and then fails short, and therefore replacement of the array can be made to insure that no exposure is lost.

Another modification of the FIG. 2 circuit is to bias the gating circuit of the sensing transistor 36 to reduce the level of load current through the sensing resistor 16 or indicator bulb 16' at which the lockout or inhibit circuit for removing voltage from the D-C logic sequencing control circuit is energized. As has been mentioned, the voltage drop across the current sensing resistor 16 or indicator bulb 16' when a bias circuit is not used must be in excess of 0.6 volt in order to turn on the sensing transistor 36, assuming that this is a silicon device. By connecting a bias resistor 42 between the base of transistor 36 and the negative D-C supply terminal 14, the required voltage drop across resistor 16 or bulb 16' can be reduced below 0.6 volt. In other words, the level of load current at which the lockout circuit is energized is reduced. This results in a saving in battery power and increases the application flexibility of the circuit.

By means of the next modification, it is possible to inhibit the start of sequencing until a selected time after the sequencing circuit is energized. This can be done in two ways within the sequencing flashing circuit. One way is to inhibit the Darlington transistor pair 32, 33 to delay the application of voltage to the sequencing logic control circuit until a selected time after closure of the shutter switch 17. A normally closed mechanical or static switch 43 is connected between the negative D-C supply terminal 14 and the base of transistor 32, and a current limiting resistor 44 is connected between this same base electrode and the positive D-C supply terminal 13. Additionally, a blocking diode 45 is inserted between the junction of switch 43 and resistor 44, and the junction of resistor 24_b_ and the collector of latching lockout transistor 37. With the switch 43 closed, the transistor 32 is biased to its nonconducting state. In order to open the switch 43 and initiate the sequencing, it is necessary to supply a signal from an outside signal circuit 46. This can be in the form of an electrical signal or a mechanical signal. To implement this arrangement, it is further required that the gating circuit for the first lamp circuit SCR 15_a_ be energized from the common emitter bus 21. Preferably this gating circuit is identical to that used in the other stages, and includes components 20_a_, 22_a_, 30_a_, and 31_a_ arranged in the same manner except that the other end of resistor 22_a_ is returned to negative supply terminal 14. SCR 15_a_ is immediately rendered conductive upon each successive opening of switch 43.

A second way of inhibiting the operation of the sequencing control circuit is illustrated in FIG. 3_a_, where the FIG. 3_a_ circuit is inserted between the terminals _x_ and _y_ shown in the first stage or channel in FIG. 3. (Gating circuit components 20_a_, 22_a_, 30_a_, and 31_a_ are assumed not to be present.) The load terminals of a first logic transistor 47 are coupled across the anode-gate electrode of SCR 15_a_, and the load terminals of a second logic transistor 48 are connected between the base of transistor 47 and the anode of SCR 15_a_. The transistor switch 48, of course, is normally open, and sequencing is delayed until the electrical signal from the outside signal circuit 46 is applied to the base of transistor 48 to render it conductive and result in closing the switch.

In still another modification of the FIG. 2 circuit illustrated in FIG. 3_b_, SCR 15_a_ is replaced by power transistor 49_a_. SCR's 14_b_–15_d_ are also replaced by power transistors 49_b_–49_d_ (not illustrated). Logic transistor 47 is connected in a similar manner with its emitter connected to the base of power transistor 49 and the two collectors connected together in common. By adding a mechanical or static switch 50 between the base of logic transistor 47 and the common connected collectors, the capability is provided of both starting the sequencing at a selected time and interrupting any load current that is flowing at a selected time. By supplying a signal from the outside signal circuit 46 to close the switch 50, the start of the sequencing can be controlled. By opening the mechanical or static switch 50, logic transistor 47 is turned off which in turn turns off power transistor 49_a_. Consequently, any load current that is flowing through any of the power transistors in any of the lamp circuits is interrupted when the switch 50 is opened. As will be recalled, this occurs because it is always necessary that the preceding stage power device be conducting.

Referring again to FIG. 3, a final modification of the FIG. 2 circuit involves adding to the sequencing control circuit an extra stage beyond the final stage or channel. Thus, logic transistor 20_f_ and resistor 22_f_ are added, and the collector of logic transistor 20_f_ is connected to the base of lockout transistor 37 to complete a logic control circuit across the lamp terminals of the final lamp circuit. The added logic transistor 20_f_ is rendered conductive in the same manner as the other logic transistors, namely, when the fourth lamp circuit SCR 15_d_ is conducting and the flash lamp 11_d_ is open-circuited. By the connection back to the lockout transistor 37, turning on the added logic transistor 20_f_ renders conductive the lockout transistors 37 and 36, thereby de-energizing the sequencing control circuit. This feature has utility when the shutter switch 17 is erroneously closed after having flashed all of the flash lamps 11_a_–11_d_ in the array 11. Battery drain is minimized by removing the source of current to the logic transistors. This feature also has utility in implementing a system in which the election to use the sequencing flashing circuit is made by plugging in the array 11. It is not necessary in this case to make the election in some other way, such as by closing another switch on the camera when it is desired to have flash capability.

Although not previously discussed, the optional feature of delaying the energization of the D-C logic sequencing control gating circuit until a selected time after the closure of the shutter switch 17 relates generally to compatibility of the sequencing flashing circuit with the rest of the camera system. The specifics of a particular situation depend upon the design of the camera, which obviously can differ from one camera system to the next. Typically, it is desired to allow time for an automatic exposure control to operate before starting the sequencing, or it is desired to obtain proper flash synchronization. There are two reasons for wanting to control the time during which the sequencing circuit is energized. One is to reduce the drain on the battery, but the other more important reason is to reduce the power dissipation in the circuit, since it may lead to excessive temperatures in the monolithic or hybrid integrated circuit chip. Control of the start of sequencing and interruption of any load current that is flowing by modifications internal to the sequencing circuit itself has already been described with regard to FIGS. 3, 3*a*, and 3*b*. It will now be shown how the sequencing flashing circuit can be de-energized after a predetermined period of time by means of additional circuitry external to the sequencing flashing circuit. By still another circuit addition external to the sequencing flashing circuit, the energization of the sequencing circuit can be delayed for a predetermined period of time, then de-energized after another preselected interval during which it is operative.

It will be observed that the circuit shown in FIG. 4 is divided into three sections, namely, a delay open timer, an open timer, and a static switch. This circuit is constructed in a form suitable to be manufactured as a monolithic or hybrid integrated circuit. For the moment it will be assumed that the delay open timer option is not desired, and that only the open timer and static switch are to be used to apply power to the sequencing flashing circuit upon the closure of the camera actuated shutter switch 17 in the positive D-C supply terminal 13', and that the sequencing circuit is de-energized after a preselected interval of, by way of illustration, 30 milliseconds. The static switch terminals A and C are connected to the correspondingly lettered terminals of the FIG. 2 circuit. The mechanical shutter switch 17 shown in FIG. 2 is moved to the other end of the open timer circuit in FIG. 4, and is replaced by a static switch in the form of an npn transistor 54. The static transistor switch 54 is connected in the common emitter configuration with its collector connected directly to the D-C positive supply terminal 13', and its base connected to the same point through a bias resistor 55. As soon as power is applied to the circuit by closure of the switch 17, static transistor switch 54 turns on and applies power to the sequencing flashing circuit by the connection of its emitter to the junction of the current sensing resistor 16 and the emitter of sensing transistor 36.

The open timer circuit comprises an npn transistor 56 having its collector connected to the D-C supply terminal 13' and its emitter connected through a voltage divider resistor 57 and the collector-to-emitter path of an npn transistor 58 to the negative D-C supply terminal 14'. The transistor 58 is connected as a diode by directly connecting together its collector and base electrodes. The transistor 56 functions as a Zener diode in conjunction with a pair of voltage divider resistors 59 and 60 connected across its collector and emitter electrodes, the junction point of resistors 59 and 60 being connected directly to the base. When the voltage at the base of transistor 56 rises above a diode drop, the transistor turns on, and as the voltage rises even higher, the transistor becomes more conductive to limit the voltage drop across these components. Transistor 56 and its associated resistors 59 and 60, in conjunction with resistor 57, establish a constant reference voltage at the junction point 61 between them. The emitter of a reference pnp transistor 62 is connected to the junction point 61, thereby establishing a constant reference voltage for transistor 62. A timing capacitor 63 is connected between the positive D-C supply terminal 13' and the base of reference transistor 62, and is further in series with the collector-to-emitter path of a constant current transistor 64. The emitter of constant current transistor 64 is connected to the negative D-C supply terminal 14', while the base is connected directly to the base of transistor 58, which it will be recalled is connected as a diode. Transistors 64 and 58 together function as a constant current source. Current flowing through resistor 57 and transistor 58 drives the constant current transistor 64 into conduction. The timing capacitor 63 charges down, or negatively, through constant current transistor 64 until the potential at the base of reference transistor 62 becomes sufficiently negative, with respect to the reference voltage at junction point 61, to render it conductive. The collector of reference transistor 62 is connected to the base of a static switch turn-off transistor 65 whose emitter-to-collector path is connected in series with resistor 55 between the supply terminals 13' and 14'. When the reference transistor 62 turns on, its collector current drives the static switch turn-off transistor 65 into conduction, thereby dropping the potential of the base of static transistor switch 54 to approximately that of the D-C negative supply terminal 14', turning it off. Thus, the sequencing flashing circuit is de-energized after being conductive for a preselected interval of time.

As was explained, the delay open timer section is added to the front end of the open timer when it is desired to delay the closing of the static switch 54 for a preselected period after the closure of shutter switch 17. The open timer then operates as before to open the static switch 54 after a preselected interval. The delay open timer circuit comprises a resistor 68 connected between the D-C positive supply terminal 13' and the common connected bases of a pair of mirror-image npn transistors 69 and 70 whose emitters are both connected to the negative D-C supply terminal 14'. The collector of transistor 70 is connected to the collector of constant current source transistor 58, and the collector of transistor 69 is connected to the collector of static switch turn-off transistor 65. When power is applied to the circuit, current flow through resistor 68 turns on both of transistors 69 and 70. Transistor 70 inhibits the constant current source comprising transistors 58 and 64. Transistor 69 drops the potential of the base of static switch 54 to approximately that of the D-C negative supply terminal 14', biasing off static switch 54 in the same way as if turn-off transistor 65 were conducting. Another resistor 71 is connected between supply terminal 13' and the common connected bases of another pair of mirror-image npn transistors 72 and 73 whose emitters are both connected to supply terminal 14'. The collector of transistor 72 is also connected to resistor 71, while the collector of transistor 73 is connected through another timing capacitor 74 to supply terminal 13'. Transistors 72 and 73 in conjunction with resistor 71 function as a constant current source that charges the timing capacitor 74 negatively. A second reference transistor 75 has its emitter connected to the constant reference voltage point 61, its base connected to the junction of timing capacitor 74 and transistor 73, and its collector connected to the base of a turn-off transistor 76. The collector-to-emitter path of turn-off transistor 76 is connected between the common connected bases of transistors 69 and 70 and the supply terminal 14'.

When timing capacitor 74 charges through constant current source elements 71–73 to a voltage sufficiently negative with respect to the reference voltage at junction point 61, reference transistor 75 turns on and in turn renders conductive the transistor 76. Conduction of current through transistor 76 causes transistors 69 and 70 to turn off. Consequently transistor 70 no longer inhibits constant current source 58, 64 in the open timer, and transistor 69 no longer biases off static switch 54. Static switch 54 now turns on and supplies voltage to the sequenching flashing circuit. The open timer operates as before to charge the timing capacitor 63 through the constant current transistor 64, and when the voltage at the base of reference transistor 62 is sufficiently negative with respect to the voltage at junction point 61, reference transistor 62 turns on and drives into conduction the turn-off transistor 65. Shutter switch 54 therefore returns to its non-conducting state and removes power from the sequenching flashing circuit after the predetermined time interval.

The use of the static switch 54 is desirable, but due to limited battery voltage, the voltage drop across the static switch 54 and the current sensing resistor 16 may be too large to be tolerated. That is, there would then be insufficient voltage to operated the D-C logic sequencing control circuit in the sequencing flashing circuit. Assuming that only the open timer circuit and static switch, FIG. 4, are used, then it is not possible to use the voltage drop across the static switch 54 to sense the application of current to the next continuous lamp filament without employing a discrete capacitor to slow down the operation of the lockout circuit. FIG. 5 shows a current detector circuit suitable for fabrication as a monolithic or hybrid integrated circuit that can be employed to sense the current through the static switch 54, or more specifically, the voltage drop across the static switch, with only a few added millivolts voltage drop. The current detector circuit of FIG. 5 is connected between the static switch and the correspondingly lettered terminals of the FIG. 2 sequencing flashing circuit. The terminal connections are indicated on all three circuits, namely, FIGS. 4, 5, and 2. It will be noted that current sensing resistor 16 is not used. The current detector comprises essentially a differential amplifier including a pair of resistors 80 and 81 connected to the positive D-C supply terminal 13' and respectively to the collectors of a pair of npn transistors 82 and 83 whose emitters are connected together in common and through another resistor 84 to the negative D-C supply terminal 14'. The emitter of static switch 54 is connected in series with a sensing resistor 85 which is further connected across the respective base electrodes of transistors 82 and 83 of the differential amplifier. The output of the differential amplifier is indicated by npn transistor 86. The emiter and base of transistor 86 are connected respectively with the collectors of transistors 82 and 83, while the collector of transistor 86 is connected to the base of in-rush load current sensing transistor 36 in FIG. 2.

When the differential amplifier senses a predetermined few millivolts of voltage drop across the sensing resistor 85, corresponding to a predetermined relatively small current through it, output transistor 86 conducts and supplies base drive current to the sensing transistor 36, turning it on and consequently latching on the lockout transistor 37. In this way, the D-C logic sequencing control circuit is de-energized.

FIG. 6 shows a substantially different embodiment of the invention in which the sequencing is initiated with an electrical signal from an outside circuit, and that does not include a lockout or inhibit circuit for de-energizing the D-C logic sequencing control circuit. One problem associated with the FIG. 1 circuit not heretofore mentioned is the effect of random contact bouncing upon closing and opening the mechanical shutter switch 17. To prevent false sequencing, switch bounce upon opening and closing the switch should terminate within a relatively short interval, in the order of one hundred to a few hundred microseconds. The embodiment of FIG. 6 eliminates the problem of excessive random bouncy opening of shutter switch 17 which could cause false sequencing. Only a portion of the disposable flash lamp array 11 is illustrated together with the corresponding channels or stages of the sequencing circuit, and it will be understood that the other stages are identical. The D-C logic sequencing control circuit is similar to that shown in FIG. 1, with the exception that a logic transistor 47 is connected between the gate of SCR **15*a* and the common emitter bus 21, and a bias resistor 89 is provided for logic transistor 47. With this arrangement, SCR 15*a* turns on automatically only when there is current flow in the common emitter bus 21**.

Another difference is that the disposable array 11 has an elongated contact 90 that bridges across two auxiliary terminals 91 and 92 in the sequencing flashing circuit when the array 11 is plugged into place. Positive D-C supply terminal 13 is connected to terminal 91. Terminal 92 is connected to the collector of transistor 32 in the sequencing control circuit, and also to the emitter of an additional pnp transistor switch 93 whose collector is connected to the base of transistor 32. A bias resistor 94 is connected across the emitter-base of transistor switch 93, and a voltage dividing resistor 95 connects the base of transistor switch 93 to an output lead 96. To complete the circuit, a high impedance circuit is connected between the output lead 96 and the negative D-C supply terminal 14, and is here illustrated as a timer comprising a relatively high value resistance 97 in series with a capacitor 98. The value of the resistor 97 is more specifically relatively high as compared to the values of resistors 94 and 95. In order to initiate the sequencing, in a manner to be explained, a momentarily closed static or mechanical switch 99 is also connected between the output lead 96 and the negative D-C supply terminal 14.

Upon plugging in the array so that the elongated contact 90 bridges across terminals 91 and 92, the current through resistors 94 and 95, due to the high impedance of elements 97 and 98, is relatively small. There is, accordingly, insufficient voltage drop across the bias resistor 94 to turn on the transistor switch 93. The small current then flowing through the output lead 96 can be used to indicate that the array 11 is plugged into place. To this end, a circuit 100 for sensing the plugged-in array can be connected, if desired, to the end of output lead 96. To initiate the sequencing at a selected time interval after closing shutter switch 17, it is only necessary to momentarily close switch 99 for a relatively short time in order of a few microseconds. By connecting the output lead 96 to the negative DC supply terminal 14, the voltage drop across bias resistor 94 is now sufficient to turn on the transistor switch 93. This in turn renders conductive the transistor 32 and forward biases the two diodes 34 and 35 so that current is supplied to the common emitter bus 21, initially turning on the first SCR **15*a* to flash the first lamp 11*a*. SCR 15*a* remains latched on after momentary switch 99 opens. Upon subsequent closures of the camera actuated shutter switch 17, and subsequently momentarily closing the switch 99, the other lamps in the array will be flashed in sequence in the manner already explained. Since switch 99 is closed for several microseconds, there is sufficient time to sequence through the DC logic sequencing control circuit and turn on the next SCR device in sequence. Even though power is removed after a few microseconds, the SCR remains latched on and it makes no difference that the switch 99 is now opened. A significant feature of this circuit is that it is not necessary to use the current sensing transistor 36 and latching lockout transistor 37, i.e., the entire lockout or inhibit circuit. The current sensing resistor 16 in this circuit appears in the negative DC supply terminal and only has a current limiting function. This circuit is advantageous when it is desired to control the start of sequencing electronically. A desirable feature is that the sequencing flashing circuit is de-energized when the array 11** is not plugged in.

In summary, the improved sequencing static electronic flashing circuit for use in flash photography with an array of *n* flash lamps flashes one lamp at a time in sequence each time the circuit is energized in time relation to the opening of a camera shutter, and operates at high speed to sequence through the array within a few microseconds. The circuit automatically by-passes open-circuited lamps and burns out air lamps; flashed short-circuited lamps cause a malfunction but their presence can be indicated visually as a signal to replace the array. While the circuit can be implemented with discrete components, an important feature is that it can be fabricated completely as a monolithic or hybrid integrated circuit. The DC logic sequencing control circuit for controlling the sequence of turn-on of the solid state switching device in series with each lamp requires, as conditions for rendering conductive a switching device to supply current to its respective lamp, that the previous device be conducting and that the voltage across the preceding lamp terminals exceed a threshold voltage. Thus all previous control circuit paths are conducting. In some embodiments, current or light sensing operates a lockout to inhibit the sequencing control circuit and thereby prevent further unwanted flashes, but in another embodiment the lockout is not employed and sequencing is initiated by an externally generated pulse that energizes the control circuit for a few microseconds during the duration of the pulse. By modifications internal to the sequencing flashing circuit the start of sequencing after closure of the camera shutter actuated switch, and any load current that is flowing can be interrupted at a selected time. External timer circuits that operate a static switch can also be used to de-energize the circuit after a predetermined interval, or optionally delay the start of sequencing after closing the camera shutter actuated switch.

While the invention has been particularly shown and described with reference to several preferred embodiments thereof, it will be understood by those skilled in the art that the foregoing and other changes in form and detail may be made therein without departing from the spirit and scope of the invention.

What we claim as new and desire to secure by Letters Patent of the United States is:

1. A circuit for sequentially flashing photoflash lamps, comprising a plurality of lamp circuits arranged in the predetermined order of first to last including a first lamp circuit having a pair of lamp terminals for connection to a flash lamp, and at least one other lamp circuit including a switching means in series circuit relationship with a pair of lamp terminals for connection to a flash lamp, said lamp circuits being connected in parallel to one another between a pair of terminals for connection with circuit energizing means that is operative repetitively to couple the circuit across a source of electric potential and subsequentially decouple the circuit after a time interval, sequencing control means coupled with all of said lamp circuits for rendering conductive said lamp circuits in sequence to supply current to a respective lamp when said terminals are energized, said sequencing control means comprising means for initially supplying current to the first lamp circuit, and threshold logic control means having control electrodes connected across each pair of lamp terminals, except those in the last lamp circuit, and adapted to be rendered conductive only when the voltage across that pair of lamp terminals exceeds a threshold voltage, said threshold logic control means having output terminals connected to supply a turn-on signal to the succeeding switching means in the next lamp circuit whenever said threshold logic control means is rendered conductive, and turn-off means for generating a turn-off signal and connected for de-energizing said sequencing control means in response to current being supplied to a continuous lamp filament.

2. A circuit according to claim 1 wherein said switching means is comprised by a solid state semiconductor switching means having a control electrode, and including means connecting the control electrode of each solid state switching means to said threshold logic control means to receive the turn-on signal.

3. A circuit according to claim 1 wherein said theshold logic control means comprises constant voltage drop means respectively connected in series circuit relationship with the logic switching means for each associated lamp circuit.

4. A circuit according to claim 1 wherein said switching means is comprised by a solid state semiconductor switching means having a control electrode, and said threshold logic control means comprises constant voltage drop means, a switching device for each associated lamp circuit and having a control electrode coupled to the preceding lamp circuit and a pair of load terminals coupled respectively to an end of said constant voltage drop means and to the control electrode of the next lamp circuit switching means, and means connected to apply said turn-off signal to the other end of said constant voltage drop means.

5. A circuit according to claim 1 wherein said turn-off means for de-energizing said sequencing control means comprises current sensing means for sensing the application of current to a continuous lamp filament, and lockout means responsive to said current sensing means for de-energizing said sequencing control means upon occurrence of said application of current to a continuous lamp filament.

6. A circuit according to claim 1 wherein said turn-off means for de-energizing said sequencing control means comprises light sensing solid state switching means connected and positioned to be rendered conductive by the flashing of a lamp.

7. A circuit according to claim 1 further including means for energizing said sequencing control circuit with an externally produced electrical signal having a sufficient time duration to sequence the circuit and cause current to be supplied to a continuous lamp filament.

8. A circuit for sequentially flashing photoflash lamps, comprising a plurality of lamp circuits arranged in the predetermined order of first to last and each including a solid state switching means in series circuit relationship with a pair of lamp terminals for connection to a flash lamp, said lamp circuits being connected in parallel to one another for connection with circuit energizing means that is operative repetitively to couple the circuit across a source of electric potential in time relation to the opening of a camera shutter and subsequently decouple the circuit after a time interval, sequencing control means coupled with all of said lamp circuit switching means for rendering conductive said switching means in sequence to supply current to a respective lamp each time said power supply terminals are energized, said sequencing control means comprising means for initially rendering conductive the first lamp circuit switching means, and threshold logic control means comprising solid state switching means having control electrodes connected across each pair of lamp terminals, except those in the last lamp circuit, so as to be rendered conductive only when the voltage across that pair of lamp terminals exceeds a threshold voltage, said threshold logic control means having output electrodes connected to supply a turn-on signal to the succeeding switching means in the next lamp circuit whenever said threshold logic control means is rendered conductive, and turn-off means for generating a turn-off signal and connected for de-energizing said sequencing control means in response to current being supplied to a continuous lamp filament.

9. A circuit according to claim 8 wherein said solid state switching means in each lamp circuit is comprised by gate controlled thyristor means having a latching characteristic, and said threshold logic control means comprises constant voltage drop means, a solid state switching device for each associated lamp circuit and having a control electrode coupled to the preceding lamp circuit and a pair of load terminals coupled respectively to an end of said constant voltage drop means and to the gate electrode of the gate controlled thyristor means in the next lamp circuit, and means connected to apply said turn-off signal to the other end of said constant voltage drop means.

10. A circuit according to claim 9 wherein the gate controlled thyristor means in the first lamp circuit has a gating circuit connection that automatically renders it conductive when the power supply terminals are energized, to thereby provide said means for initially rendering conductive the first lamp circuit switching means.

11. A circuit according to claim 9 wherein the gate controlled thyristor means in the first lamp circuit has a gating circuit that includes a solid state switching device connected to be rendered conductive to supply a turn-on signal to the first lamp circuit thyristor means when the sequencing control means is energized, normally closed switch means for inhibiting said sequencing control circuit, and outside signal means for opening said switch means, to thereby delay the start of sequencing until a selected time after the power supply terminals are energized and provide said means for initially rendering conductive the first lamp circuit switching means.

12. A circuit according to claim 9 wherein the gate controlled thyristor means in the first lamp circuit has a gating circuit that includes a solid state switching device connected to render it conductive when said gating circuit switching device is rendered conductive, normally open switch means connected to control the conducting state of said gating circuit switching device, and outside signal means for closing said switching means to turn on said gating circuit switching device, and thereby provide said means for initially rendering conductive the first lamp circuit switching means and delay the start of sequencing until a selected time after the power supply terminals are energized.

13. A circuit according to claim 8, in which said turn-off means includes a current-sensing resistance element connected in series with one of said power supply terminals to be effectively in series circuit relationship with each of said lamp circuits.

14. A circuit according to claim 13 wherein said current-sensing resistance element is provided by an indicator light bulb having a filament mass selected to light up the indicator bulb only when load current is supplied for a prolonged period of time to a short-circuited lamp.

15. A circuit according to claim 13 wherein said turn-off means for de-energizing said sequencing control means further includes sensing solid state switching means that is rendered conductive by the passage of in-rush load current through said current-sensing resistor to indicate application of current to a continuous lamp filament, and lockout solid state switching means that is rendered conductive by said sensing switching means and effets de-energization of said sequencing control means.

16. A circuit according to claim 15 additionally including threshold logic control means connected across the lamp terminals of the last lamp circuit, said additional threshold logic control means being coupled to said lockout switching means to effect de-energization of said sequencing control means when the threshold voltage across said last lamp circuit lamp terminals is exceeded.

17. A circuit according to claim 8 wherein said turn-off means for de-energizing said sequencing control means comprises light activated solid state switching means with a latching characteristic that is rendered conductive by the flashing of a lamp.

18. A circuit according to claim 8 further including switch means connected in one of said power supply terminals to be effectively in series circuit relationship with each of said lamp circuits, means causing said switch means to be closed when the power supply terminals are energized, and an open timer circuit for opening said switch means to de-energize said sequencing circuit after a preselected time interval.

19. A circuit accordinng to claim 18 further including a delay timer circuit for opening said switch means when the power supply terminals are energized and inhibiting said open timer circuit for a preselected time interval, after which said switch means closes and the open timer circuit operates to reopen said switch means after the preselected time interval.

20. A circuit according to claim 18 wherein said switch means is a solid state static switch, and further including low voltage drop current-sensing means connected in series with said static switch for sensing the current through said static switch.

21. A circuit for sequentially flashing photoflash lamps, comprising a plurality of lamp circuits arranged in the predetermined order of first to last and each including a pair of lamp terminals for connection to a flash lamp and a solid state switching device of the type having a control electrode and connected in series with said pair of lamp terminals, said lamp circuits being connected in parallel to one another between a pair of terminals that in turn are connected through a series resistance element and a camera actuated shutter switch across a source of electric potential for energizing the circuit in time relation to the opening of a camera shutter and de-energizing the circuit after a time interval upon the opening of said shutter switch, sequencing control means coupled with all of said lamp circuit switching devices for rendering conductive said switching devices in sequence to supply current to a respective lamp each time the camera shutter actuated switch is closed to energize the circuit, said sequencing control means comprising means for initially rendering conductive the first lamp circuit switching device, and threshold logic control means connected across each pair of lamp terminals, except those in the last lamp circuit, and adapted to be rendered conductive only when the voltage across that pair of lamp terminals exceeds a threshold voltage, to supply a turn-on signal to the succeeding switching device in the next lamp circuit whenever said threshold logic control means is rendered conductive, wherein said threshold logic control means comprises constant voltage drop means and, for each associated lamp circuit, at least one solid state switching device that has a control electrode coupled to the preceding lamp circuit and a pair of load terminals coupled respectively to said constant voltage drop means and to the control electrode of the switching device in the next lamp circuit, sensing means for sensing the in-rush load current due to the application of current to a continuous lamp filament through said series resistance element, and lockout means responsive to said sensing means and connected for de-energizing said sequencing control means in response to the occurrence of said in-rush load current.

22. A circuit according to claim 21 wherein each lamp circuit switching device is a silicon controlled rectifier, each threshold logic control means switching device is a transistor, and said series resistance element is a current-sensing resistor.

23. A circuit according to claim 22 wherein said sensing means comprises a transistor having its emitter-base coupled across said current-sensing resistor to be rendered conductive by the voltage drop thereacross when current is supplied to a continuous lamp filament, and said lockout means comprises a transistor having its base coupled to the collector of said sensing means transistor and its emitter-collector connected in series with a pair of bias resistors between said supply terminals, the base of said sensing means transistor being connected to the junction of said bias resistors, and bias means for turning on said lockout means transistor in response to said sensing means transistor being rendered conductive.

24. A circuit according to claim 23 wherein the constant voltage drop means of said sequencing control means comprises at least one transistor having its collector-base connected across said bias resistors, and at least one diode connected to the emitter of said last-mentioned transistor so that it will conduct in response to current flow in the emitter of said last-mentioned transistor.

25. A circuit for sequentially flashing photoflash lamps, comprising a plurality of lamp circuits arranged in the predetermined order of first to last and each including a pair of lamp terminals in series circuit relationship with a solid state switching device of the type having a control electrode, a disposable array of photoflash lamps plugged into said pairs of lamp terminals, and a contact on said disposable array that bridges across an auxiliary pair of terminals when plugged into position, a current-sensing resistor, said lamp circuits being connected in parallel to one another and, through one of said auxiliary terminals, respectively in series with said current-sensing resistor and a camera shutter actuated switch across a source of electric potential for coupling the circuit across the source of electric potential in time relation to the opening of a camera shutter and decoupling the circuit after a time interval upon the opening of said shutter switch, said shutter switch further being connected between one of said auxiliary terminals and one terminal of the source of electric potential, sequencing control means coupled to all of said lamp circuit switching devices for rendering conductive said switching devices in sequence to supply current to a respective lamp during each successive time interval that the camera shutter actuated switch is closed, said sequencing control means comprising means for initially rendering conductive the first lamp circuit switching means, and threshold logic control means having control electrodes connected across each pair of lamp terminals, except those in the last lamp circuit, and adapted to be rendered conductive only when the voltage across that pair of lamp terminals exceeds a threshold voltage, said threshold logic control means having output terminals connected to supply a turn-on signal to the succeeding switching device in the next lamp circuit whenever said threshold logic control means is rendered conductive, static switch means connecting said sequencing control means to the other auxiliary terminal, means for coupling said static switch to the other terminal of said source of electric potential, and means for developing an electrical signal that renders conductive said static switch and sequencing control means for a sufficient time duration to sequence said circuit and supply current to a continuous lamp filament, said sequencing control means being de-energized when said electrical signal is removed.

26. A circuit according to claim 25 wherein said last-mentioned impedance is a relatively high impedance, said means for developing an electrical signal comprises momentarily closed switch means connected in shunt with said high impedance, and said static switch comprises a transistor having its base electrode coupled to the junction of said high impedance and momentarily closed switch means.

27. A circuit according to claim 25 wherein said threshold logic control means comprises constant voltage drop means and, for each associated lamp circuit, at least one solid state switching device that has a control electrode coupled to the preceding lamp circuit and a pair of load terminals coupled respectively to said constant voltage drop means and to the control electrode of the switching device in the next lamp circuit.

28. A circuit according to claim 27 wherein said means for initially rendering conductive the first lamp circuit switching means comprises solid state switching means connected to conduct and supply a turn-on signal to the first lamp circuit switching means when said sequencing control means is energized.

29. A circuit according to claim 25 wherein said static switch means comprises a transistor, and said means for developing an electrical signal comprises switch means coupled between the base electrode of said static switch transistor and the other terminal of said source of electric potential.

30. A circuit for sequentially flashing photoflash lamps, comprising at least three lamp circuits each comprising a pair of lamp terminals for connection to an individual photoflash lamp, at least the second and third of said lamp circuits each including a solid state switching means connected in series with the pair of lamp terminals thereof, each of said switching means being provided with a control electrode for rendering the switching means conductive upon application of suitable voltage to the control electrode, means connecting said lamp circuits into an electrical parallel circuit arrangement, a pair of current terminals for connection to a current source, means including a current-sensing resistor connecting said parallel circuit arrangement across said pair of current terminals, a first transistor device having an output electrode connected to the control electrode of said switching means of the second lamp circuit and having a pair of input electrodes, means connecting said pair of input electrodes across the lamp terminals of said first lamp circuit thereby to render said switching means of the second lamp circuit conductive for applying current from said current source to the lamp of said second lamp circuit provided the lamp of said first lamp circuit has been flashed, a second transistor device having an output electrode connected to the control electrode of said switching means of the third lamp circuit and having a pair of input electrodes, means connecting said last-named input electrodes across the lamp terminals of said second lamp circuit thereby to render said switching means of the third lamp circuit conductive for applying current from said current source to the lamp of said third lamp circuit provided the lamp of said second lamp circuit has been flashed, means connected to provide a turn-off signal in response to lamp-flashing current flowing through said current-sensing resistor, and means for applying said turn-off signal to input electrodes of all of said transistor devices so as to prevent any of said transistor devices from thereafter causing any of said switching means to be rendered conductive during the occurrence of said turn-off signal.

31. A circuit as claimed in claim 30, in which said output electrodes of said transistor devices are collector electrodes, and in which said turn-off signal is applied to an emitter electrode of each of said transistor devices.

32. A circuit as claimed in claim 31, including a voltage-drop means connected between said turn-off signal means and said emitter electrodes.

33. A circuit as claimed in claim 30, in which said first lamp circuit includes a first solid state switching means connected in series with the pair of lamp terminals thereof, and including means adapted for connection to an external actuating signal source for rendering said first switching means conductive upon each occurrence of said external actuating signal.

References Cited

UNITED STATES PATENTS

| | | | |
|---|---|---|---|
| 3,019,393 | 1/1962 | Rockafellow | 315—323 X |
| 3,484,626 | 12/1969 | Grafham | 307—305 X |
| 3,501,254 | 3/1970 | Nijland | 431—95 X |
| 3,518,487 | 6/1970 | Tanaka et al. | 431—95 X |

EDWARD J. MICHAEL, Primary Examiner